United States Patent [19]

Shigei et al.

[11] Patent Number: 4,839,757
[45] Date of Patent: Jun. 13, 1989

[54] MANUAL HEAD LOADING MECHANISM FOR FLEXIBLE DISK DRIVE

[75] Inventors: Masahiro Shigei; Shugo Suto; Masahiro Tatsukami, all of Tokyo, Japan

[73] Assignee: Oki Electric Industry Co., Ltd., Tokyo, Japan

[21] Appl. No.: 54,398

[22] Filed: May 26, 1987

[30] Foreign Application Priority Data

May 26, 1986 [JP] Japan .................................. 61-78081
Jun. 20, 1986 [JP] Japan .................................. 61-93352
Jun. 23, 1986 [JP] Japan .................................. 61-144739

[51] Int. Cl.$^4$ ............................................. G11B 5/016
[52] U.S. Cl. .......................... 360/99.05; 360/99.12; 360/105
[58] Field of Search .................................. 360/97–99, 360/104–106

[56] References Cited

U.S. PATENT DOCUMENTS

| | | | |
|---|---|---|---|
| 4,419,703 | 12/1983 | Gruczelak et al. | 360/97 |
| 4,604,666 | 8/1986 | Kitahara et al. | 360/99 |
| 4,651,246 | 3/1987 | Becker | 360/105 |
| 4,665,454 | 5/1987 | Tsuchiya et al. | 360/97 |
| 4,675,762 | 6/1987 | Noda et al. | 360/97 |
| 4,709,281 | 11/1987 | Inoue et al. | 360/97 |
| 4,736,357 | 4/1988 | Uehara et al. | 360/99.02 |

Primary Examiner—Stuart N. Hecker
Assistant Examiner—David J. Severin
Attorney, Agent, or Firm—Wenderoth, Lind & Ponack

[57] ABSTRACT

A flexible disk drive includes a reset lever which holds an upper head in an upper or open position in an unloaded condition of a magnetic head and, interlocked with a closing motion of a door, moves downward together with the upper head, and a head load arm rotatable in response to downward movement of the reset lever to allow the upper head to make contact with a floppy disk. Connected to the head load arm is toggle device whose biasing direction is inverted by the rotation of the arm to bias the arm toward the disk. A hub adapted to rotate a floppy disk is located to face a collet which is adapted to align the center of the disk with that of the hub. When the door is closed while a floppy disk is not inserted, the collet is brought into engagement with the hub. At this instant, a gap is defined between the upper head and a lower head by a clamp lock to prevent the two heads from making contact with each other. While a floppy disk is inserted, the collet cooperates with the hub to check the disk in response to a closing motion of the door. A sequence lever responsive to a closing motion of the door allows the upper head to contact the disk thereafter. This provides a reliable manual head loading mechanism which insures accurate chucking of a floppy disk.

15 Claims, 9 Drawing Sheets

MANUAL HEAD LOADING MECHANISM FOR FLEXIBLE DISK DRIVE

BACKGROUND OF THE INVENTION

1. Field of the Art

The present invention relates to a flexible disk drive and, more particularly, to a manual loading mechanism for a magnetic disk drive which has a pair of magnetic heads for recording and reproducing information out of a magnetic recording medium making contact with, respectively, the upper and lower surfaces of the recording medium.

2. Description of the Prior Art

A flexible disk drive is used to record information in and read information from a floppy disk or a flexible disk which is loaded in the disk drive. A disk drive of the type using a floppy disk which accommodates information on both surfaces thereof, i.e. a two-sided floppy disk, is provided with a pair of magnetic heads. A floppy disk is rotated while chucked by a hub or a spindle that is held in driven connection with a spindle motor. The magnetic heads are mounted one above the other and operated such that when the floppy disk is loaded, the upper one of the heads, or upper head, is lowered toward the lower one, or lower head, so as to hold the disk between the heads. The heads are movable in the radial direction of the disk to record information or read information from a desired track of the disk.

A prerequisite with a flexible disk drive of this kind is that magnetic heads surely make contact with a magnetic recording medium, e.g. a two-sided floppy disk. This is implemented with an arrangement wherein an upper head assembly which holds a magnetic head adapted for the upper surface of a recording medium is movable downward toward a carrier which holds a magnetic head adapted for the lower surface of the medium.

A flexible disk drive is known in the art which uses a solenoid for raising and lowering a magnetic head as stated above. However, a problem with a solenoid type head loading mechanism is that it adds to the overall weight, cost and power consumption of the apparatus due to the great number of constituent parts required, e.g. a solenoid, a drive circuit and a power source. Another problem is that when the power of the apparatus is switched off while a recording medium is loaded, the medium cannot be ejected and should it be ejected forcibly, it might damage the magnetic head. On the other hand, when the recording medium is removed slowly, the upper and lower heads are brought into close contact with each other because the apparatus is still in a loaded condition. When the apparatus is switched on again with the two heads held in contact, a cam mechanism of the apparatus is actuated in a direction for raising the upper head resulting that a gimbal which supports the head, is deformed to impair the head.

In the light of the above, there has been proposed a head loading mechanism which replaces the solenoid with a cam mechanism for raising and lowering the upper head, as disclosed in Japanese Patent Laid-Open Publication No. 2268/1984. In such disclosed mechanism, a lug extends sideways from an upper head so that, when a cam type bar slides, it moves the upper head up and down through the lug.

While a magnetic recording medium is not loaded in the apparatus, the carrier and the upper head are spaced from each other to prevent the magnetic heads from interfering with each other. The flexible disk drive is provided with a head protection mechanism in order to implement such actions which are associated with the carrier and upper head.

An example of prior art disk protection devices is disclosed in Japanese Patent Laid-Open Publication No. 98361/1984, entitled "Media Protection Device for Floppy Disk Drive." The protection device disclosed is such that as a floppy disk is inserted into a disk drive, a clamp lock is angularly moved by the disk to in turn allow an operating lever to be rotated by hand. As the operating lever is manually rotated, a collet adapted to press the center of the disk is lowered toward the hub of a spindle motor, causing the upper head to move downward toward the lower head. So long as a floppy disk is not inserted, the clamp lock is maintained in its original or inoperative position to inhibit the rotation of the operating lever. Under this condition, the upper and lower heads are spaced from each other, and so are the collet and the hub.

The above-described type of prior art protection device suffers from various drawbacks, as will be described. Because an inlet for a recording medium which is formed in the disk drive is not provided with a closure member or door, and, therefore, is open all the time, dust particles are apt to enter the disk drive to reach the gap between the hub and the collet and become deposited on the surfaces of the heads. Such would lower the chucking force acting on the medium and/or render the recording and reading of data incomplete or impracticable. Further, it is impossible for a recording medium to be effectively freed from undulation, or waving, inside of the disk drive.

Meanwhile, there has been proposed a flexible disk drive of the type having a door adapted to close an opening for the ingress/egress of a floppy disk. This type of disk drive is constructed such that alignment of the center of a floppy disk with that of a hub, chucking of the disk, and access of a magnetic head to the disk are effected by being interlocked with a closing motion of the door. Specifically, while the door is moved toward a position for closing the opening, an upper head makes access to a floppy disk to hold it in cooperation with a lower head and, at this instant, a collet is about to start aligning the center of the disk with that of the hub. Stated another way, the access of the upper head to the floppy disk is completed before the collet centers the disk, thus, exerting an excessive load on the subsequent centering action. This sometimes prevents the collet from performing accurate centering and, thereby, brings about an occurrence that the edge of the center hole of a floppy disk is partly caught between the outer periphery of the collet and the inner periphery of the hub. When the disk is chucked in an eccentric position due to such inaccurate alignment, data write-in or read-out becomes incomplete or impractical and, in the worst case, valuable information stored in the disk is destroyed.

The above occurrence may be eliminated by another known structure which uses a solenoid or like drive source. Specifically, after the collet has centered a floppy disk with respect to the hub, the collet and the hub chuck the disk and, at the same time, the solenoid is energized to cause the upper head to make access to the disk. Such a scheme, however, has a problem which is inherent in a solenoid type drive. Namely, the solenoid not only increases the overall weight of the disk drive but also has to be accompanied by a drive circuit for operating the solenoid in the above sequence and a power source for the drive circuit, resulting in increases in cost and power consumption.

SUMMARY OF THE INVENTION

It is therefore an object of the present invention to provide an improved flexible disk drive which is free from the drawbacks discussed above.

More specifically, another object of the present invention is to provide a reliable head protection device for a flexible disk drive which is not susceptible to ambient conditions.

Still another object of the present invention is to provide a head loading mechanism for a flexible disk drive which allows an upper head to be surely moved up and down without resorting to a solenoid and, yet, eliminates damage to the upper head and a lower head which otherwise would be caused by the collision of the two heads.

A farther object of the present invention is to provide a flexible disk drive which, despite a simple and inexpensive structure thereof, accomplishes with accuracy the centering and chucking of a floppy disk as well as access of a magnetic head to the floppy disk.

A head protection device in accordance with the present invention includes rotatable arm means which carries a collet for retaining a magnetic recording medium therewith and angularly movable between first and second positions in response to opening and closing of a door which is disposed in an opening for the ingress/egress of the medium. A rotatable head load arm means is provided with a magnetic head, and is movable between a contact position where the head makes contact with the medium and a non-contact position where it does not make contact with the medium, and is caused to bias the head toward the contact position when the head is moved by a predetermined distance toward the contact position. A clamp lock means is constantly biased against the insertion of the medium, is rotatable when the medium is inserted, and is not rotatable when the medium is not inserted so as to support the head load arm means such that the head remains in the non-contact position. A resiliency transmitting means operates, when the door is closed to rotate the rotatable arm means toward the second position, further rotating the clamp lock means, which has been rotated by the insertion of the medium, while rotating the head load arm means to move the head toward the contact position and, when the door is closed, to rotate the arm means toward the second position with the medium not inserted, holding the head load arm supported by the clamp lock to maintain the head in the non-contact position. When the rotatable arm means, moved to the second position by closing of the door, is moved toward the first position by opening of the door, the rotatable arm means is engaged with the head load arm means to rotate it such that the head is moved toward the non-contact position.

The head protection device in accordance with the present invention is operated as follows.

When a magnetic recording medium is inserted into the opening of the disk drive, the clamp lock means is rotated into contact with the medium against the biasing force. Then, as the door is closed, the rotatable arm means is rotated from the first position toward the second position so that resiliency transmitting means further rotates the clamp lock means in order to, for example, space the clamp lock means from the medium and, at the same time, rotate the head load arm means to move the head to the contact position. This biases the head load arm means to move the head to the contact position where it makes contact with the medium. On the other hand, the collet on the rotatable arm means serves to hold the medium in cooperation with, for example, a hub which is located below the medium and operatively connected to a drive motor.

When the door is closed while the medium is not loaded, the rotatable arm means is rotated from the first position to the second position. However, the head load arm means is not rotated by the resiliency transmitting means because it is supported by the clamp lock means, i.e., the head is maintained in its non-contact position.

When the door is opened to rotate the arm means from the second position to the first position while the head is in the contact position with the medium inserted, the head load arm means is rotated until the head reaches the non-contact position.

This eliminates entry of dust into the disk drive through the opening and, thereby, frees the head, collet and other essential parts of the disk drive from the deposition of dust which would effect the medium chucking force and the data writing and reading functions.

A head loading mechanism for a flexible disk drive in accordance with the present invention includes a reset lever which maintains an upper head in an open position while a magnetic recording medium is not loaded and moves downward in interlocked relation to closing of a door, a head load arm rotatable in response to the downward movement of the reset lever to bring the upper head into contact with the medium, and toggle means for, on a predetermined angle of rotation of the head load arm, changing over its biasing force to urge the head load arm toward the medium.

In the above construction, when the door is closed, the reset lever is lowered together with the upper head to cause the upper head and a lower head to abut against the medium, the head load arm being pressed downward by the reset lever. When the biasing direction of the toggle means is changed over, the head load arm is moved toward the medium by the toggle means until the upper head is caused to move into contact with the medium.

A flexible disk drive in accordance with the present invention includes a head load arm which is provided with a lug, and a sequence lever provided with a lug for receiving the lug of the head load arm and movable horizontally at a side of the head load arm. The sequence lever is actuated after a pressure arm has been moved by a predetermined amount in response to closing of a door.

In the above construction, as the door is closed after the insertion of a magnetic recording medium into the disk drive, the pressure arm is rotated to move a collet into a center hole of the medium to thereby center the medium. At this instant, because the lug of the head load arm is sustained by that of the sequence lever, the rotation of the head load arm is inhibited resulting in that the upper head is prevented from making access to the medium. At the same time, a reset lever which rotates in response to the rotation of the pressure arm bends a spring member which is provided on the head load arm.

After the centering operation stated above the collet and a hub are mated together to chuck the recording medium. As soon as the lug of the head load arm is released from the sequence lever which is actuated later than the pressure arm, the head load arm is pulled downward by the spring member to allow the access of the upper head to the medium.

Hence, the medium is centered before a load is exerted thereon by the upper head. Such enhances accurate centering, chucking and access of the upper head and, thereby eliminates the failure of writing and reading functions as well as destruction of data stored, while reducing the over weight, cost and power consumption of a flexible disk drive.

BRIEF DESCRIPTION OF THE DRAWINGS

The objects, features and advantages of the present invention will become more apparent from a consideration of the following detailed description taken in conjunction with the accompanying drawings in which.

DESCRIPTION OF THE PREFERRED EMBODIMENTS

Figure 1:
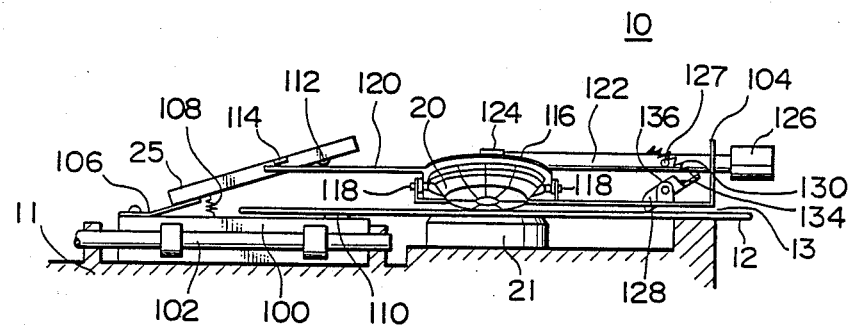
FIG. 1 is a side elevation showing a prior art head protection device for a flexible disk drive.
Figure 2:
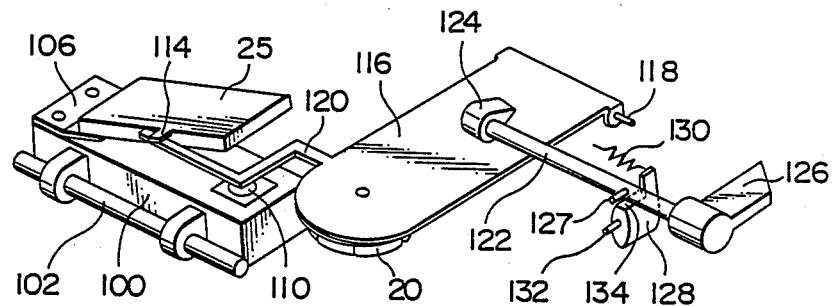
FIG. 2 is a fragmentary perspective view of the device as shown in FIG. 1.

To facilitate an understanding of the present invention, a brief reference will be made to a prior art head protection mechanism for a flexible disk drive, shown in FIGS. 1 and 2. Specifically, FIG. 1 shows a prior art flexible disk drive disclosed in Japanese Patent Laid-Open Publication No. 98361/1984 as previously mentioned, the disk drive being shown with a floppy disk loaded therein. FIG. 2 shows in a perspective view a head protection mechanism of the disk drive of FIG. 1 in a condition wherein the floppy disk is not loaded.

As shown in FIGS. 1 and 2, the flexible disk drive, generally 10, includes a base frame 11 on which a hub 21, a guide shaft 102 and a clamp base 104 are mounted. The hub 21 is operatively connected to a motor, not shown, while the guide shaft 102 is adapted to support a carrier 100 such that the latter is slidable along the former. An upper head assembly 25 is connected to the carrier 100 by a leaf spring 106 to be movable toward and away from the carrier 100, the assembly 25 being constantly biased by a spring 108 toward the carrier 100. A first magnetic head 110 is mounted on the carrier 100, and a second magnetic head 112 on the upper head assembly 25. An arm 114 extends sideways from the upper head assembly 25.

A clamp support plate 116 is mounted on the clamp base 104 to face the hub 21 and in such a manner as to be rotatable about a shaft 118. The clamp support plate 116 is constantly biased by a spring, not shown, away from the hub 21. A collet 20 adapted to chuck a floppy disk 12 is rotatably held by the clamp support plate 116. The arm 114 of the upper head assembly 25 rests on and is supported by a support arm 120 which extends out from the clamp support plate 116. A shaft 122 is journalled to the clamp base 104 and provided with a cam 124 at one end thereof, the clamp support plate 116 abutting against the cam 124 from below. An operating level 126 is rigidly connected to the other end of the shaft 122. A pin 127 is studded on an intermediate portion of the shaft 122 to extend radially outward from the shaft 122.

A clamp lock 128 is rotatably mounted on a shaft 132 and constantly biased by a spring 130 counterclockwise as viewed in FIG. 1. The clamp lock 128 is provided with a stop surface 134 and a receiving surface 136.

While the floppy disk 12 is not loaded in the disk drive 10, the clamp lock 128 assumes a vertical position, as shown in FIG. 2. In this condition, when an effort is applied to the operating lever 126 for rotating it, the pin 127 of the shaft 122 abuts against the stop surface 134 of the clamp lock 128 to prevent the rotation of the operating lever 126 and, thereby, the rotation of the collect 20 and upper head assembly 25. This maintains the first and second magnetic heads 110 and 112 spaced from each other, i.e., prevents them from colliding with each other.

As shown in FIG. 1, while the floppy disk 12 is inserted into the disk drive 10 through an opening 13, it abuts against and urges the clamp lock 128 clockwise, as viewed in FIG. 1, against the action of the spring 130. Then, the operating lever 126 is ready to be rotated. As the lever 126 is rotated, it rotates the cam 124 through the shaft 122 so that the clamp support plate 116 is rotated about the shaft 118 by the cam 124, causing the collet 20 to chuck the disk 12 in cooperation with the hub 21. On the rotation of the plate 116, the upper head assembly 25 is released from the support arm 120 of the plate 116, with the result that the assembly 25 is rotated by the spring 108 until the second magnetic head 112 abuts against the upper surface of the disk 12.

Referring to FIGS. 3 to 6, 8 and 9, a flexible disk drive embodying the present invention will be described in detail. In these drawings, the same or similar structural elements as those shown in FIGS. 1 and 2 are designated by like reference numerals.

In accordance with this embodiment, the flexible disk drive, generally 10, includes a base frame 11 adapted to cover the bottom of the disk drive 10. The base frame 11 is provided with an opening 13 for the insertion of a floppy disk 12, on the right-hand side of FIG. 4. A closure member 14, or door, is movably mounted on a shaft 14A to close the opening 13. The door 14 is openable to load and unload the floppy disk 12.

A collet support lever, or pressure arm, 15 is rotatably mounted on a shaft 16 at one end thereof and inside of the opening 13. The lever 15 is constantly biased by a torsion coil spring, not shown, clockwise as indicated by an arrow A1 in FIG. 4. Connected to the other end of the lever 15 is one end of a leaf spring, or hub spring plate, 17. An elongate reset lever 18 is retained at one end thereof by a part of the leaf spring 17. The other end of the reset lever 18 is rotatably supported by a support plate 19 which is rigidly connected to the left-hand side of the frame 11 as viewed in FIG. 4.

A frustconical collet 20 is mounted on the underside of the leaf spring 17 while a hub 21 is provided on the frame 11 to correspond in position to the collet 20. A drive motor 23 is held in driving connection with a spindle 22 of the hub 21. The collet 20 is movable downward to mate with the center hole of the floppy disk 12 while aligning the center of the disk 12 with that of the spindle 22. The hub 21 and motor 23 serve to drive the disk 12 in a rotational motion.

A lower head assembly 24 arranged on the base frame 11 while an upper head assembly 25 is arranged above and in face-to-face relation with the lower head assembly 24. The upper and lower head assemblies 25 and 24 are movable as indicated by a double-headed arrow B in FIG. 3. A first magnetic head 110 and a second magnetic head 112 are respectively supported by the lower and upper head assemblies 24 and 25 as illustrated. The heads 110 and 112 are capable of making contact with, respectively, the lower and upper surfaces of the floppy disk 12 which are made of a magnetic material, so as to magnetically write and read information thereoutof. The heads 24 and 25 are selectively driven in the directions B of FIG. 3 by a stepping motor 27 through a feed screw 26 until they reach a desired track of the disk 12.

Figure 4:
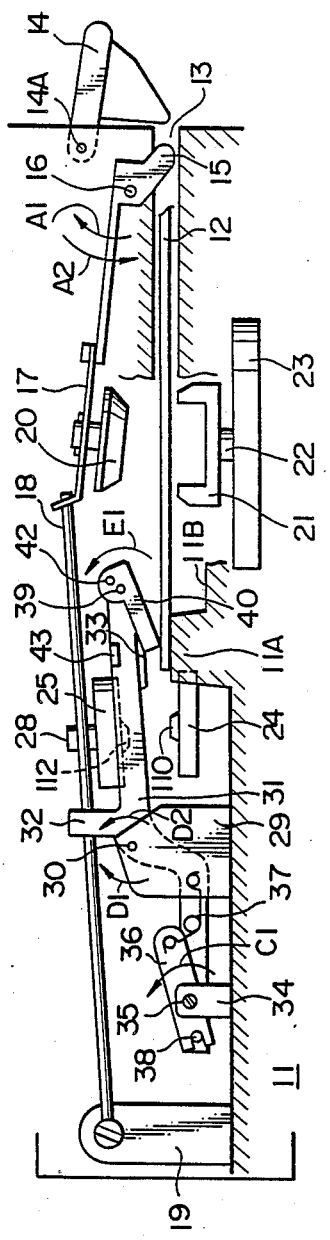
FIG. 4 is a side elevation of the device of FIG. 3, showing a magnetic recording medium inserted halfway into the disk drive.

The upper head assembly 25 is journalled at one end thereof adjacent to the stepping motor 27 and constantly biased by a torsion coil spring, not shown, downward as viewed in FIG. 4. A lug 28 extends sideways from the assembly 25 and rests on the reset lever 18, whereby the assembly 25 is spaced from the lower head assembly 24.

Figure 3:
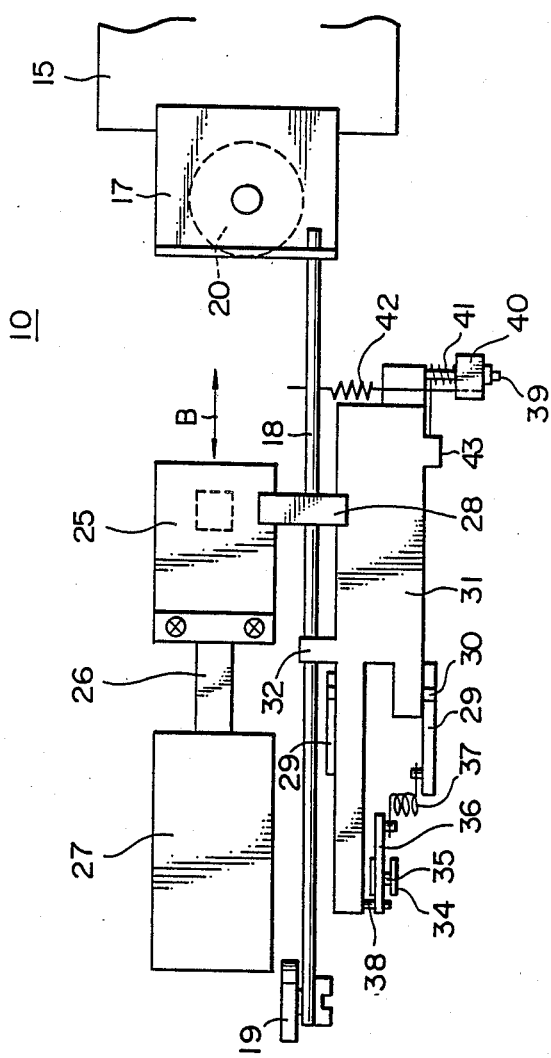
FIG. 3 is a schematic plan view of a flexible disk drive embodying the present invention.

A pair of upright support plates 29 extend upwardly from the base frame 11. An intermediate portion of a head load arm 31 is mounted to the support plates 29 by a shaft 30. As shown in FIG. 3, the head load arm 31 has a longitudinal axis extending parallel to that of the reset lever 18. A lug 32 extends sideways and horizontally from an intermediate portion of the arm 31 and rests on the reset lever 18.

In this particular embodiment, a cushioning member 33 is fitted on the underside of the head load arm 31 while a projection 11A, FIG. 4, is provided in that part of the base frame 11 which faces the cushioning member 33. The cushioning member, or cushion, 33 is adapted to nip the floppy disk 12 between itself and the projection 11A to thereby prevent the disk 12 from undulating, while protecting the surface of the disk 12 when brought into contact therewith.

Another support plate 34 is positioned between the support plates 19 and 29. An amplifying lever 36 is rotatably mounted on the support plate 34 by a shaft 35.

A toggle spring 37 is anchored at one end to one end of the amplifying lever 36 and at the other end to the support plate 29, as illustrated. The other end of the amplifying lever 36 is engaged with a pin 38 which is studded on the head load arm 31.

The amplifying lever 36 is constantly biased by the toggle spring 37 counterclockwise as indicated by an arrow C1 in FIG. 4. However, as the lever 36 is rotated clockwise as indicated by an arrow C2 in FIG. 5 following a downward motion of the head load arm 31, the biasing direction of the toggle spring 37 is inverted snappingly to urge the lever 36 in the clockwise direction C2 and the arm 31 in the clockwise direction D1. The lever 36 and spring 37 constitute toggle means in combination.

A clamp lock 40 is rotatably mounted by a shaft 39 to the tip (right-hand side in the drawings) of arm 31. The clamp lock 40 is constantly biased by a torsion coil spring 41, FIG. 3, in the counterclockwise direction E1 as viewed in FIG. 4, extending across the path for the insertion of the floppy disk 12, see FIG. 6. A coil bar 42 is anchored at one end thereof to a point of the clamp lock 40 which is offset from the center of rotation 39 of the clamp lock 40. The other end of the coil bar 42 is positioned below the reset bar 18, as shown in FIG. 3. On the other hand, the head load arm 31 is provided with a horizontally extending stop 43 which serves to limit the rotation of the clamp lock 40.

The head loading mechanism for the flexible disk drive having the above construction is operated as follows.

The floppy disk 12 is inserted into the disk drive with the door 14 opened until it becomes settled on the projection 11A of the frame 11 and the lower head assembly 24. During this movement, the disk 12 thrusts away the clamp lock 40 against the action of the spring 41. Subsequently, when the door 14 is closed, it urges the collet support lever 15 in the counterclockwise direction A2 and, thereby, causes the leaf spring 17 and reset lever 18 to start moving downward to the position of FIG. 5, as indicated by an arrow F2 in FIG. 9. Then, the collet 20 which is mounted on the leaf spring 17 mates with the center hole of the disk 12 to chuck the disk 12 on the hub 21, while aligning the center of the disk 12 with that of the hub 21.

Figure 5:
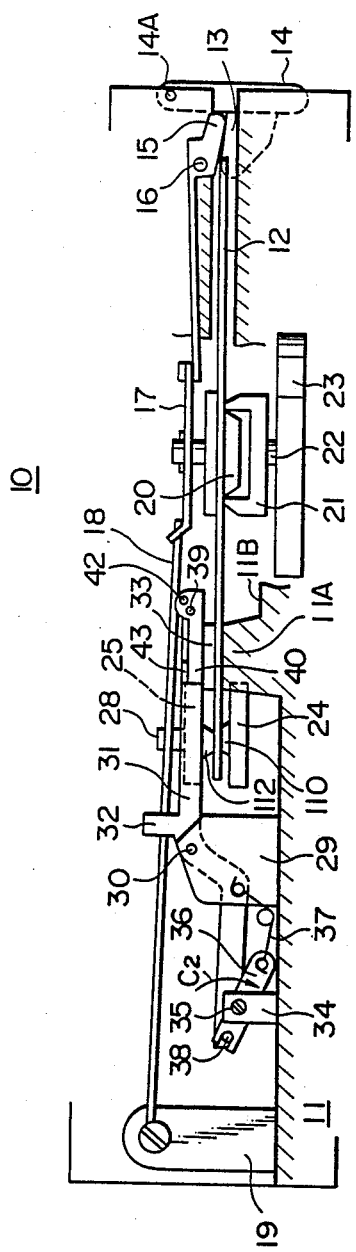
FIG. 5 is a vertically sectioned side elevation showing a condition in which a door is closed with the medium loaded in the disk drive.
Figure 9:
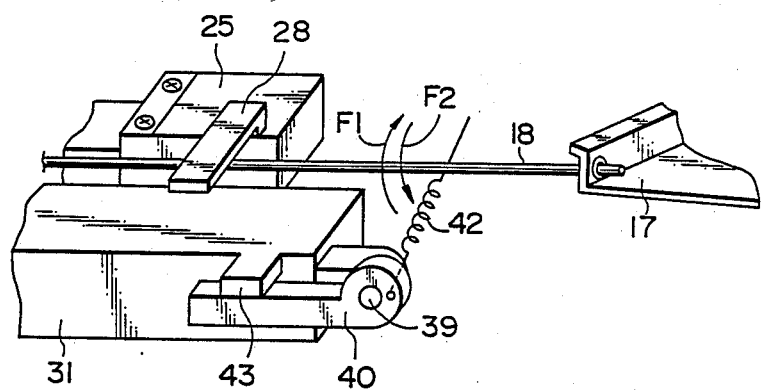
FIG. 9 is a perspective view of the clamp lock in a condition in which the door is closed with the medium loaded.

The reset lever 18 being lowered as stated above pushes the coil bar 42, see FIG. 3, downward resulting in that the clamp lock 40 is further rotated clear of the disk 12 until its free end abuts against the stop 43, see FIGS. 5 and 9. The head load arm 31 is pushed downward together with the coil bar 42 to rotate in the clockwise direction D1 about the shaft 30, so that the amplifying lever 36 is also rotated in the clockwise direction C2 against the action of the toggle spring 37. As soon as the amplifying lever is rotated by a predetermined angle, the biasing direction of the spring 37 is inverted snappingly, as shown in FIG. 5. The spring 37 now urges the lever 36 and arm 31 in the clockwise direction C2, causing the cushion 33 of the arm 31 into contact with the disk 12.

The counterclockwise rotation of the collet support lever 15 entails a downward movement of the reset lever 18, whereby the upper head assembly 25 is lowered by the spring force to bring the second head 112 into contact with the upper surface of the disk 12. Subsequently, the drive motor 23 is energized to rotate the disk 12 to write information in the disk 12 or read it out.

Figure 8:
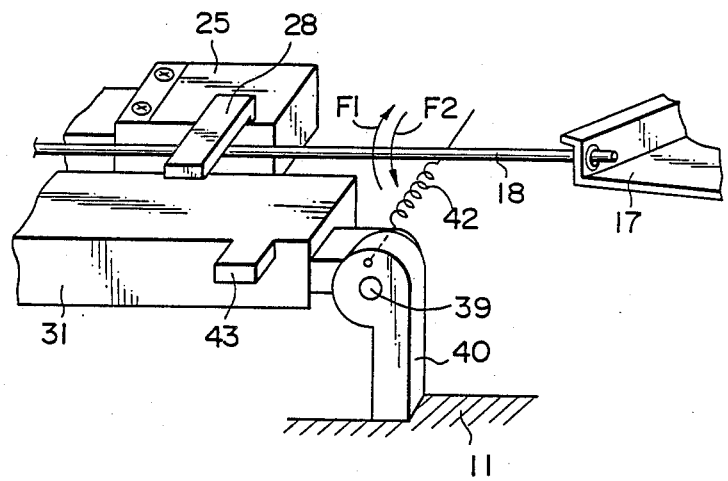
FIG. 8 is a perspective view showing a clamp lock in a condition in which the door is closed without the medium being loaded.

Thereafter, when the door 14 is opened, the collet support lever 15 is rotated in the clockwise direction A1 by the force of a spring, not shown, so that the leaf spring 17 and, therefore, the reset lever 18 start moving upward as indicated by an arrow F1 in FIG. 8. Because the lug 32 of the head load arm 31 rests on the reset lever 18, the arm 31 is also rotated in the counterclockwise direction D2. While the arm 31 is moving in the direction D2, the biasing direction of the toggle spring 37 is restored to C1. This causes the arm 31 to urge the upper head assembly 25 slightly upward through the lug 28, thereby producing a gap between the two heads 110 and 112.

Meanwhile, the collet 20 is moved clear of the center hole of the floppy disk 12 due to the upward movement of the leaf spring 17 while, at the same time, the disk 12 is ejected through the opening 13 by a predetermined ejection mechanism, not shown.

Figure 6:
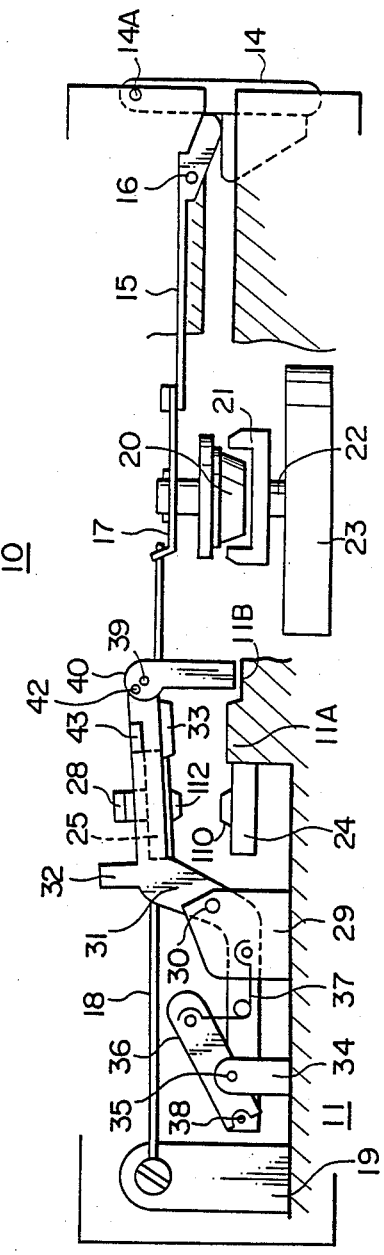
FIG. 6 is a side elevation showing a condition in which the door is closed with no magnetic recording medium loaded in the disk drive.

Assume that the door 14 is closed with the disk 12 not loaded in the disk drive 10. Then, the upper head assembly 25 tends to move downward in response to the downward movement of the reset lever 18. However, as shown in FIG. 6, the clamp lock 40 remains positioned vertically downward due to the absence of the disk 12, the free end of the clamp lock 40 abutting against a shoulder 11B of the base frame 11. Hence, the head load arm 31 is prevented from being lowered, see FIG. 8. The upper head assembly 25, too, is prevented from being lowered because its lug 28 is positioned on the head load arm 31. In this condition, the gap between the heads 110 and 112 is maintained to surely protect the heads from the damage otherwise caused by collision.

While the toggle mechanism has been shown and described as consisting of the amplifying lever 36 and the toggle spring 37, it may be implemented with any other suitable construction so long as the snap type changeover of the direction of biasing force acting on the head load arm 31 is insured.

Figure 7:
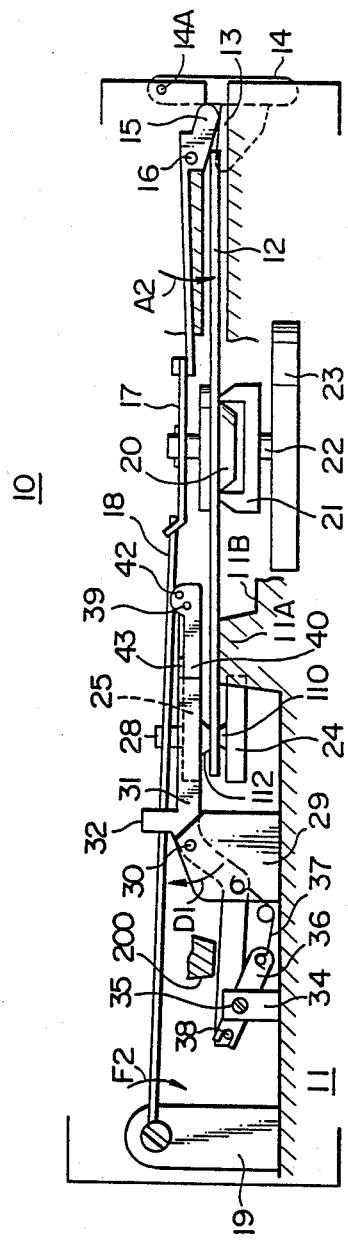
FIG. 7 is a side elevation similar to FIG. 5, showing an alternative embodiment of the present invention in a condition in which a door is closed with a magnetic recording medium loaded.

In the above embodiment, the cushion 33 is fitted on the lower surface of the head load arm 31 serves to prevent the floppy disk 12 from undulating, or waving. An alternative embodiment which does not use the cushion 33 is shown in FIG. 7. In this alternative embodiment, a limiter 200 is provided so that when the head load arm 31 is rotated in the direction D1, the limiter 200 may check any further movement of the arm 31. The rest of the construction of FIG. 7 may be identical with the construction which has been described with reference to FIGS. 3 to 6.

As the floppy disk 12 is inserted into the disk drive 10 through the opening 13, the clamp lock 40 is rotated to a position where it makes contact with the surface of the disk 12. Thereafter, when the door 14 is closed, the pressure arm 15, hub spring 17 and reset lever 18 individually start rotating as indicated by arrow F2 in interlocked relation to the door 14. The reset lever 18 abuts against and urges the coil bar 42 so that the clamp lock 40 is rotated until it abuts against the stop 43 of the head load arm 31. Then, the clamp lock 40 is lowered together with the head load arm 31. While the head load arm 31 is rotated in the direction D1 until it makes contact with the limiter 200, the biasing direction of the toggle switch 37 is inverted applying tension to the arm 31 in the direction D1. The upper head 112 is placed on the disk 12 to hold it in cooperation with the lower head 110. The collet 20 support by the hub spring 17 chucks the disk 12 in cooperation with the hub 21. In this instance, the clamp lock 40 has been urged by the reset lever 18 to have its free end abutting against the stop 43 and, therefore, it does not interfere with the disk 12. The other part of the operation is the same as the embodiment shown in FIGS. 3 to 6.

As described above, the flexible disk drive in accordance with this embodiment consists of a reset lever which, in a head unloaded condition maintains an upper head in an upper or open position and, when a door is closed, lowers itself together with the upper head, a head load arm which is rotatable in response to the downward movement of the reset lever to allow the upper head to make contact with a floppy disk, and toggle means which, on a predetermined angle of movement of the head load arm, changes over its biasing direction to urge the head load arm toward the disk. The disk drive, therefore, positively moves the upper head up and down and protects the heads from damage, without the need for a solenoid.

Even when a floppy disk is not loaded in the disk drive, the door may positively be closed to prevent dust particles from entering the disk drive to thereby minimize the deposition of dust on the heads, collet and hub, which play essential roles in the disk drive. This allows the disk drive to preserve its performance for a long time without having its writing and reading functions deteriorated. A clamp lock insures the gap between the heads which is indispensable for the prevention of mutual interference between and therefore the protection of, the heads.

When a floppy disk is loaded in the disk drive, the clamp lock remains clear of the disk and, therefore, applies no frictional load to the disk. This allows a minimum of fluctuation to occur in the rotation of the disk, thereby increasing the service life of the medium.

In the particular embodiment wherein a cushion is provided on the underside of the head load arm, a floppy disk loaded in the disk drive is held between the cushion and a part of the frame of the disk drive and, thereby, effectively prevented from undergoing undulation during rotation.

Figure 10:
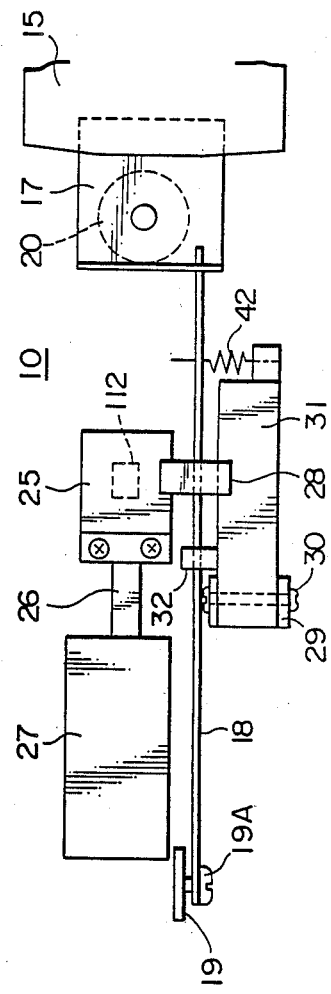
FIG. 10 is a plan view of an essential part of an exemplary prior art flexible disk drive.

Before describing another alternative embodiment of the present invention, another example of the prior art flexible disk drives will be described with reference to FIGS. 10, 11 and 12. In those figures, the same or similar structural elements as those shown in FIGS. 1 to 9 are designated by like reference numerals. As shown, the flexible disk drive 10 is provided with an opening 13 for receiving a floppy disk 12, a door 14 being associated with the opening 13. The door 14 is journalled to a housing of the disk drive 10 by a shaft 14A so as to be opened and closed as desired. A cam drive piece, or cam driver, 14B having a predetermined shape is provided on the inner surface of the door 14.

A pressure arm 15 has a cam portion 15A at one end thereof in correspondence to the cam driver 14B of the door 14. A hub spring plate 17, which may be a leaf spring, is rigidly connected to the other end of the pressure arm 15. A collet 20 is rotatably mounted on the hub spring plate 17. The pressure arm 15 is supported by a base frame 11 to be rotatable about a shaft 16 and is constantly biased by a torsion spring or like biasing means in a direction for raising the collet 20.

A hub 21 is positioned below the collet 20 to face it and is operatively connected to a drive motor 23, which is rigid on the base plate or frame 11.

A reset lever 18 is received at one end thereof in an opening which is formed through that end of the hub spring plate 17 which is adjacent to the collet 20. The other end of the reset lever 18 is rotatably mounted by a shoulder screw 19A to a support piece 19, which is mounted on the base plate 11. A head load arm 31 extends parallel to the reset lever 18 while a spring member in the form of a coil bar 42 is press-fitted in the arm 31 at one end thereof. The other end of the coil bar 42 is positioned below the reset lever 18.

The other end of the head load arm 31 is rotatably mounted by a shaft 30 to a support member 29 which is mounted on the base plate 11 in the same manner as the support member 19. An inverted L-shaped projection 32 extends upward at a position of the head load arm 31 which is adjacent to the supported end of the arm 31. The projection 32 is held in contact with the upper edge of the reset lever 18.

A cushion 33 is fitted on the underside of the head load arm 31. A disk receiving portion 11A is protruded from the base plate 11 to correspond in position to the cushion 33. The cushion 33 and the disk receiving portion 11A cooperate to maintain the floppy disk 12 flat.

An upper head assembly 25 and a lower head assembly 24 are provided with magnetic heads 112 and 110, respectively. A stepping motor 27 is mounted on the base plate 11 and has a shaft 26 which is movable in horizontal reciprocal motion toward and away from the motor 27. A generally U-shaped bracket, not shown, is mounted on the free end of the shaft 26 while the lower head assembly 24 is mounted on a lower portion of the bracket. A leaf spring or like resilient plate 25, forming the upper head assembly, is fixed by an upper portion of the bracket such as by screws. The upper head 112 is supported by the resilient plate 25 in facing relation to the lower head 110. In this construction, the upper head 112 is rotatable about an axis which is defined in the vicinity of the fixed end of the plate 25, i.e., due to the resilient motions of the plate 25. A hook 28 extends sideways from one side of the plate 25 and has a downward extension at its free end. The hook 28 rests on the reset lever 18 such that the tip of its downward extension is positioned on the head load arm 31.

The prior art flexible disk drive having the above construction is operated as follows.

Figure 11:
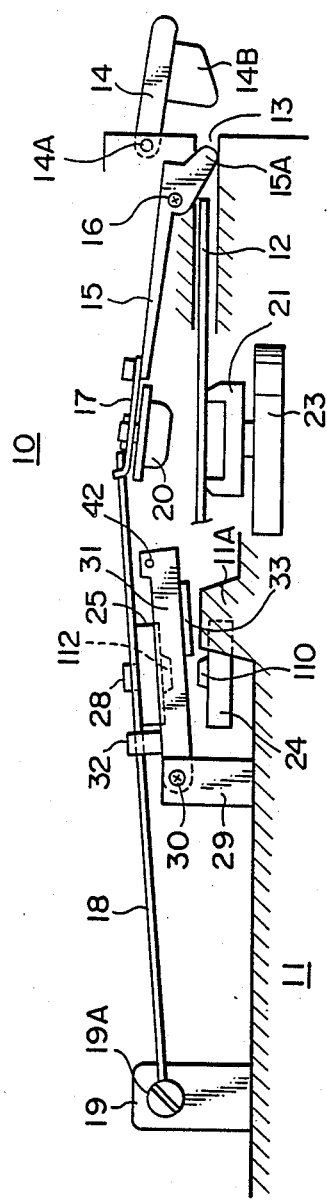
FIGS. 11 and 12 are side elevations of a device which is useful for understanding the operation of the prior art apparatus as shown in FIG. 10, FIG. 11 being representative of a condition in which a door is open and FIG. 12, a condition in which the door is being closed.
Figure 12:
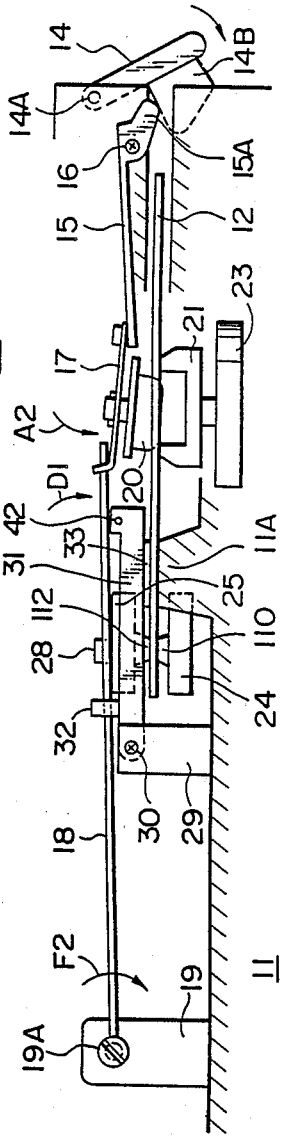

As shown in FIG. 11, while the door 14 is open, the pressure arm 15 holds the collet 20 spaced from the hub 21 under the action of biasing means, not shown. One end of the reset lever 18 which is engaged with the hub spring plate 17 is held in a raised position by the pressure arm 15. Therefore, the head load arm 31 and resilient plate 25 are also held in their raised positions through the projection 32 and hook 28 which are individually engaged with the reset lever 18. In this condition, the cushion 30 and the upper head 112 which is supported by the resilient plate 25 remain spaced from the disk receiving portion 11A and the lower head 110, respectively.

While the disk drive 10 is held in the above state, the floppy disk 12 is inserted into the disk drive 10 through the opening 13. As the disk 12 is inserted to a predetermined depth, a feed mechanism, not shown, is activated to feed the disk 12 until the center hole of the disk 12 reaches a position substantially right above the hub 21.

Subsequently, when the door 14 is moved from its open position shown in FIG. 11 toward a closed position shown in FIG. 12, the upper surface of the cam driver 14B of the door 14 urges the cam portion 15A of the pressure arm 15, upward resulting in that the pressure arm 15 is rotated about the shaft 16. This lowers the collet 20 while pressing one end of the reset lever 18 downward. The reset lever 18 is rotated clockwise about the shoulder screw 19A as indicated by the arrow F2 while pressing the head load arm 31 downward. Hence, the head load arm 31 also is rotated in the clockwise direction D1 about the shaft 30.

Consequently, the cushion 33 urges the floppy disk 12 against the disk receiving portion 11A while, at the same time, the upper head 112 is caused by the returning force of the resilient plate 25 to nip the disk 12 between itself and the lower head 110. Also, the collet 20 is mated with the hub 21 through the center hole of the disk 12 to center the disk 12 with respect to the hub 21. Further, the flange portion of the collet 20 and the upper end of the hub 21 hold the edge portion of the center hole to thereby chuck the disk 12.

In the above-described manner, two different functions, i.e., chucking of the disk 12 and access of the upper and lower heads 112 and 110 are performed at the same time in interlocked relation to the closing motion of the door 14. Thereafter, the drive motor 23 is energized to rotate the disk 12 integrally with the hub 21 and collet 20. The stepping motor 27 serves to move the heads 110 and 112 through the movable shaft 26 in the radial direction of the disk 12, whereby information is written into or read out of the disk 12.

Figure 13:
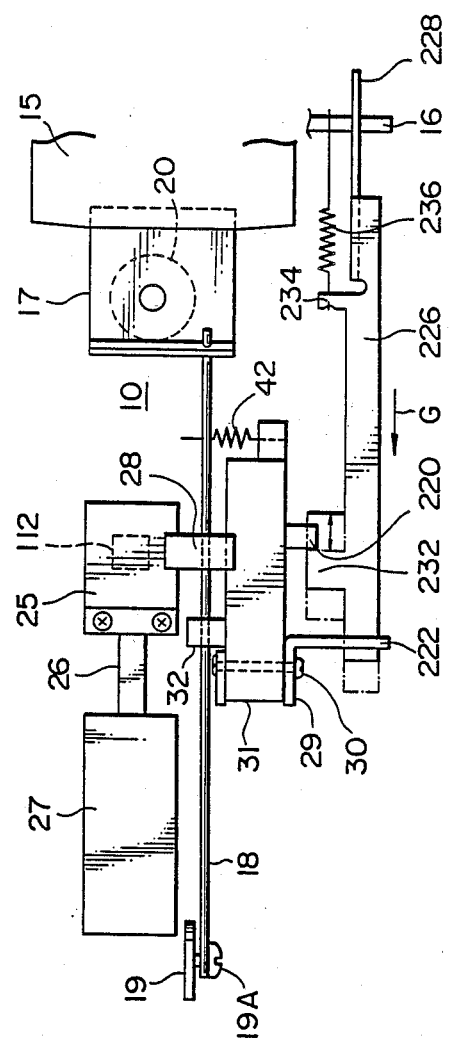
FIG. 13 is a schematic plan view showing an essential part of another embodiment of the flexible disk drive in accordance with the present invention.
Figure 14:
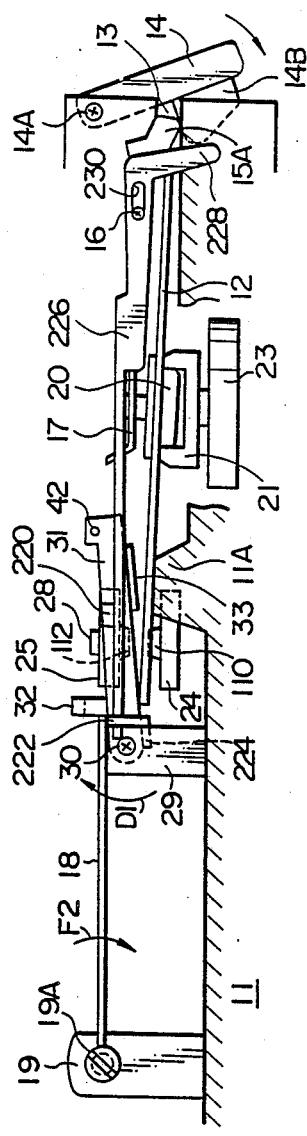
FIGS. 14 and 15 are side elevations of a device which is useful for understanding the operation of the apparatus as shown in FIG. 13, FIG. 14 showing a condition in which a door is being closed and FIG. 15, a condition in which a closure member is closed.
Figure 15:
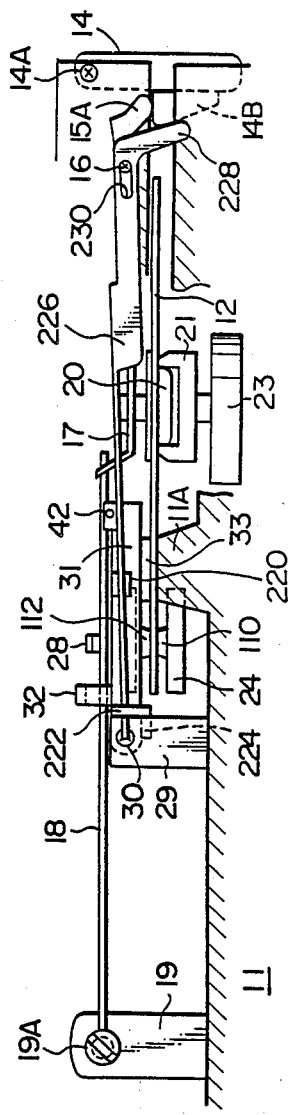

Referring to FIGS. 13, 14 and 15, an alternative embodiment of the present invention is shown. In these figures, the same or similar structural elements as those shown in FIGS. 10, 11 and 12 are designated by like reference numerals, and a redundant description thereof will be omitted. This embodiment is distinguishable from the prior art structure in that the head load arm 31 is provided with a tongue-like lug 220 on its side opposite to the projection 32, and in that the support 29 is provided with a retainer 222 having an opening, and a stop 224.

Further, the apparatus 10 in accordance with this particular embodiment includes a sequence lever 226. A projection 228 extends from one end of the lever 226 to be cammed by the cam driver 14B of the door 14 when the door 14 is closed. The lever 226 is provided with a slot 230 adjacent to the projection 228. Further, on its side adjacent to the head load arm 31, the lever 226 is provided with a lug 232 adapted to receive the lug 220 of the arm 31 and a locking lug 234, the lugs 232 and 234 extending in the horizontal direction.

The sequence lever 226 is supported substantially parallel to the head load arm 31 as seen in the plan view of FIG. 13, with its slot 230 receiving the shaft 16 and with its other end received in the opening of the retainer 222 of the support 29. In this configuration, the lever 226 is capable of moving over a distance which is equal to the length of the slot 230.

A reset spring 236 is anchored at one end of the locking lug 234 of the sequence lever 226 and at the other end to the shaft 16. The spring 236 is adapted to constantly bias the lever 226 toward the door 14 and, in this condition, the lug 220 is seated on the lug 232.

The operation of the disk drive 10 shown in FIGS. 13 to 15 will be described hereinafter. While the door 14 is open, the collet 20 is spaced from the hub 21 by biasing means, not shown, and the cushion 33 and the upper head 112 are spaced from the disk receiving portion 11A and the lower head 110, respectively. That is, the disk drive 10 stands ready for operation in the same manner as the prior art device as previously discussed. In this stand-by condition, the lug 220 of the head load arm 31 remains seated on the lug 232 of the sequence lever 226, see FIG. 13.

As the floppy disk 12 is inserted into the disk drive 10 through the opening 13, it is drawn deeper into the disk drive 10 by the feed mechanism, not shown, until its center hole reaches a position substantially right above the hub 21. When the door 14 is moved toward its closed position as shown in FIG. 14, the cam driver 14B of the door 14 urges the cam portion 15A of the pressure arm 15 with its upper surface, causing the arm 15 to rotate about the shaft 16. As a result, the collet 20 which is supported by the pressure arm 15 through the hub spring plate 17 is moved downward and, at the same time, one end of the reset lever 18 which is engaged with the plate 17 is pressed downward.

The reset lever 18 is rotated in the clockwise direction F2 about the shoulder screw 19 while applying a downward force to the head load arm 31 through the coil bar 42. However, because the lug 220 of the arm 31 is sustained by the lug 232 of the sequence lever 226, the arm 31 remains unmoved despite the downward force acting thereon and, hence, only the reset lever 18 is rotated clockwise timed to the rotation of the pressure arm 15.

On the other hand, the resilient plate 25 with the hook portion 28 which rests on the reset lever 18 is moved toward its unstressed position due to its own resiliency as the reset lever 18 is rotated, moving the upper head 112 which is supported by the plate 25 downward. When the upper head 112 has been lowered by a predetermined amount, the tip of the hook 28 abuts against the head load arm 31 preventing the head 112 from moving further downward. Consequently, the upper head 112 is held in a condition in which it does not nip the floppy disk 12, i.e., it does not make access to the disk 12, see FIG. 14.

As the movement of the door 14 toward its closed position proceeds, the projection 228 of the sequence lever 226 is urged by the front end of the cam driver 14B, whereby the lever 226 is moved as indicated by an arrow G in FIG. 13 against the force of the reset spring 236. While the lever 226 is so moved, the pressure arm 15 and the reset lever 18 are further rotated. This allows the collet 20 to enter the center hole of the floppy disk 12 and, then, to mate with the hub 21 to align the center of the disk 12 with that of the hub 21.

After such a centering operation, the lug 232 of the sequence lever 226 being moved releases the lug 220 of the head load arm 31. Then, the arm 31 is rotated by the tension of the coil bar 42 in the clockwise direction D1 to reach the stop 224, the resilient plate 25 being fully restored to its unstressed position. Hence, the cushion 33 which is mounted on the arm 31 presses the disk 12 against the disk receiving portion 11A, and the upper head 112 is brought into the access position where it nips the disk 12 between itself and the lower head 110. In the fully closed position of the door 14, as shown in FIG. 15, the flange portion of the collet 20 and the upper end of the hub 21 fully chuck the edge portion of the center hole of the disk 12.

When the door 14 is opened, the mechanisms stated above are restored to the condition of FIG. 14 by the torsion spring, not shown. The sequence lever 226 is restored to the original position due to the returning force of the reset spring 236. Finally, the lug 232 of the lever 226 is restored to the position below the lug 220. The floppy disk 12 is ejected through the opening 13 by a feed mechanism, not shown.

It is to be noted that the biasing means adapted to bias the pressure arm 15 in a rotational motion may comprise a coil spring, instead of the torsion spring. The cam portion 5A may be replaced with a roller which is rotatably supported and urged by the upper surface of the cam driver 14B. Further, the coil bar 42 which serves as a spring member may be replaced with a leaf spring.

It will be understood from the above that this particular embodiment uses a sequence lever which is operable in response to a closing motion of a door and later than a pressure arm. Specifically, the sequence lever provides a sequence of operation which is such that after the collet has centered a floppy disk, chucking of the disk by the collet and hub and the access of a magnetic head to the disk are performed. This advantageously allows the disk to be centered before a load due to the access of the head is applied to the disk.

This embodiment, therefore, eliminates undesirable catching heretofore observed to promote accurate centering and chucking as well as the access of the head, thereby freeing the disk drive from undesirable occurrences such as disturbance of writing and reading capability and destruction of information stored.

Further, because this embodiment sets up a sequence of disk centering and chucking and head access steps mechanically by means of the sequence lever, it cuts down weight, cost and power consumption, compared to a prior art apparatus which uses a solenoid for implementing the same sequence. Such a construction will prove especially effective when applied to a personal computer and other small-size instruments.

While the present invention has been described with reference to the particular illustrative embodiments, it is not to be restricted by those embodiments but only by the appended claims. It is to be appreciated that those skilled in the art can change or modify such embodiments without departing from the scope and spirit of the present invention.

What is claimed is:

1. An apparatus for use with a flexible disk drive for loading a magnetic head onto a floppy disk which is inserted into said disk drive, said apparatus comprising:

a housing provided with an opening for receiving the floppy disk and a door so supported as to selectively open and close said opening;

disk drive means supported by said housing for driving in a rotational motion the floppy disk which is inserted through said opening;

first rotatable arm means rotatably supported by said housing to selectively assume first and second positions in response to, respectively, opening and closing of said door;

second rotatable arm means carrying a magnetic head therewith and supported by said housing to be rotatable in response to rotation of said first rotatable arm means, said second rotatable arm means selectively assuming a contact position where said magnetic head is in contact with the floppy disk and a non-contact position where said magnetic head is out of contact with said floppy disk; and toggle means connected between said second rotatable arm means and said housing for normally biasing said second rotatable arm means toward said non-contact position and, when said second rotatable arm means is rotated by a predetermined angle toward said contact position, inverting a biasing direction to bias said second rotatable arm means toward said contact position.

2. An apparatus in accordance with claim 1, further comprising lock means responding to insertion of the floppy disk through said opening, said lock means maintaining said second rotatable arm means in said non-contact position when said floppy disk is not inserted.

3. An apparatus in accordance with claim 1, wherein said second rotatable arm means is provided with a layer of damping material which is fitted on that surface of said second rotatable arm means which faces the floppy disk, said layer of damping means making contact with the floppy disk when said second rotatable arm means is in said contact position.

4. An apparatus in accordance with claim 1, wherein said second rotatable arm means further comprises:
 a generally elongate first elongate member rotatably supported by said housing substantially at a center of said first elongate member; and
 magnetic head holder means supporting said magnetic head and supported by said first elongate member in the vicinity of one free end of said first elongate member, said magnetic head holder means itself being biased toward said contact position;
 said toggle means comprising:
 a generally elongate second elongate member rotatably supported by said housing substantially at a center of said second elongate member and engaged in the vicinity of one free end thereof with said first elongate member; and
 a spring member loaded between the other free end of said second elongate member and said housing for biasing said other free end.

5. An apparatus in accordance with claim 1, wherein:
 said disk drive means comprises a motor mounted on said housing for driving the floppy disk in said rotational motion, and a hub operatively connected to said motor;
 said first rotatable arm means includes third rotatable arm means which rotatably carries a collet engageable with a center hole of the floppy disk and is rotatably supported by said housing in such a manner as to selectively assume third and fourth positions in response to, respectively, opening and closing of said door, said collet being positioned to face said hub when said third rotatable arm means is in said fourth position; and
 said apparatus further comprising lock means responding to insertion of the floppy disk through said opening, said lock means locking said second rotatable arm means in said non-contact position when the floppy disk is not inserted.

6. An apparatus for use with a flexible disk drive for loading a magnetic head onto a floppy disk which is inserted into said disk drive, said apparatus comprising:
 a housing provided with an opening for receiving the floppy disk and a door so supported as to selectively open and close said opening;
 disk drive means supported by said housing for driving in a rotational motion the floppy disk which is inserted through said opening;
 first rotatable arm means rotatably supported by said housing to selectively assume first and second positions in response to, respectively, opening and closing of said door;
 second rotatable arm means carrying a magnetic head therewith and supported by said housing to be rotatable in response to rotation of said first rotatable arm means, said second rotatable arm means selectively assuming a contact position where said magnetic head is in contact with the floppy disk and a non-contact position where said magnetic head is out of contact with the floppy disk;
 toggle means connected between said rotatable arm means and said housing to normally bias said second rotatable arm means toward said non-contact position and, when said second rotatable arm means is rotated by a predetermined angle toward said contact position, inverting a biasing direction to bias said second rotatable arm means toward said contact position;
 lock means responding to insertion of the floppy disk through said opening, said lock means locking said second rotatable arm means in said non-contact position when the floppy disk is not inserted; and
 resiliency transmitting means supported at one end thereof by said lock means and engageable at the other end thereof with said first rotatable arm means, whereby;
 while said lock means is responding to insertion of the floppy disk and when said first rotatable arm means is rotated toward said second position thereof, said resiliency transmitting means further promotes motion of said lock means and rotates said second arm means toward said contact position;
 while the lock means is not operated and when said first rotatable arm means is rotated toward said second position thereof, said resiliency transmitting means causes said lock means to lock said second rotatable arm means in said non-contact position; and
 said first rotatable arm means being linked with said second rotatable arm means and, when said first rotatable arm means in the second position is rotated toward the first position, rotating said second rotatable arm means toward said non-contact position.

7. An apparatus in accordance with claim 6, further comprising limiter means for defining said contact position of said second rotatable arm means.

8. An apparatus in accordance with claim 6, wherein the second rotatable arm means is provided on that surface thereof which faces an inserted floppy disk with a layer of damping material.

9. An apparatus in accordance with claim 6, wherein:
 said second rotatable arm means comprises:
 a generally elongate first elongate member rotatably supported substantially at a center thereof by said housing; and
 magnetic head holder means supporting said magnetic head and rotatably supported by said first elongate member in the vicinity of one free end of said first elongate member, said magnetic head holder means itself being biased toward said contact position; and
 said lock means comprising a generally elongate second elongate member one end of which is rotatably supported by said first elongate member in the vicinity of said one free end of said first elongate member, said second elongate member being rotated in response to insertion of the floppy disk through said opening and, when said floppy disk is not inserted, holding said second rotatable arm means in said non-contact position.

10. An apparatus in accordance with claim 9, wherein, when the floppy disk is not inserted, said second elongate member has the longitudinal dimension thereof oriented substantially vertically, said housing having a receiving portion against which a free end of said second elongate member abuts when said second elongate member is oriented substantially vertically.

11. An apparatus in accordance with claim 9, wherein said resiliency transmitting means is supported at one end thereof by said second elongate member in the vicinity of said one end thereof, said resiliency transmitting means having another end engageable with the first rotatable arm means.

12. An apparatus for use with a flexible disk drive for loading a magnetic head onto a floppy disk which is inserted into said disk drive, said apparatus comprising:
   a housing provided with an opening for receiving the floppy disk and a door so supported as to selectively open and close said opening;
   disk drive means having a motor supported by said housing, and a hub operatively connected to said motor, said hub being engageable with a center hole of the floppy disk which is inserted through said opening;
   first rotatable arm means rotatably carrying a collet engageable with the center hole of the floppy disk and rotatably supported by said housing to selectively assume first and second positions in response to, respectively, opening and closing of said door, said collet facing said hub when said first rotatable arm means is in said second position;
   second rotatable arm means carrying a magnetic head therewith and supported by said housing to be rotatable in response to rotation of said first rotatable arm means, said second rotatable arm means selectively assuming a contact position where said magnetic head is in contact with the floppy disk and a non-contact position where said magnetic head is out of contact with the floppy disk said second rotatable arm means comprising a generally elongate first elongate member rotatably supported at one end thereof by said housing, and magnetic head holder means supporting said magnetic head and supported by said first elongate member in the vicinity of the other end thereof, said magnetic head holder itself being biased toward said contact position; and
   limiter means supported by said housing to be movable in response to opening and closing of said door to maintain said second rotatable arm means in said non-contact position until said first rotatable arm means approaches said second position, said limiter means comprising a generally elongate second elongate member supported by said housing in such a manner as to be selectively movable in response to opening and closing of said door between one position where said second elongate member makes contact with said first elongate member and another position where said second elongate member does not make contact with said first elongate member, said second elongate member assuming said one position to limit rotation of said first elongate member when said door is open and being moved toward said another position in response to a closing motion of said door to allow rotation of said first elongate member.

13. An apparatus in accordance with claim 12, wherein said first rotatable arm means comprises third rotatable arm means which carries said collet rotatably therewith and is rotatably supported by said housing to selectively assume two different positions in response to opening and closing of said door.

14. An apparatus in accordance with claim 12, wherein
   said limiter means further comprises a spring member which constantly biases said second elongate member toward said one position;
   said first elongate member having a lug; and
   said second elongate member has a lug configured to come into engagement with said first elongate member when said second elongate member is not in said another position.

15. An apparatus in accordance with claim 14, further comprising resiliency transmitting means supported at one end thereof by the other end of said first elongate member, the other end of said resiliency transmitting means being capable of abutting against said first rotatable arm means, said resiliency transmitting means, when said first rotatable arm is rotated toward the contact position of said magnetic head, biasing said first elongate member toward said contact position, and said lug of said first elongate member, when said second elongate member assumes said another position, being released from said lug of said second elongate member, whereby said magnetic head is moved to said contact position.

* * * * *